United States Patent [19]

Machin

[11] Patent Number: 5,221,186
[45] Date of Patent: Jun. 22, 1993

[54] WIND TURBINE APPARATUS WITH FLUIDIC ROTATION INDICATOR

[76] Inventor: Thomas H. Machin, P.O. Box 252, Damascus, Va. 24236

[21] Appl. No.: 780,954

[22] Filed: Oct. 23, 1991

[51] Int. Cl.$^5$ ............................................... F03D 1/06
[52] U.S. Cl. ..................... 416/61; 416/118; 416/119; 416/187; 416/188; 116/206; 116/DIG. 41
[58] Field of Search ............... 416/61, 118, 119, 187, 416/188, 205; 415/2.1, 4.1, 4.2, 4.3, 4.4, 4.5; 116/DIG. 41, 206

[56] References Cited

U.S. PATENT DOCUMENTS

| | | | |
|---|---|---|---|
| 74,687 | 2/1868 | Hidden | 415/3 |
| 1,433,995 | 10/1922 | Fowle | 416/188 |
| 2,138,999 | 12/1938 | Clark | 416/188 |
| 4,551,631 | 11/1985 | Trigilio | 415/2.1 |
| 4,604,025 | 8/1986 | Hammound | 116/DIG. 41 |
| 4,792,281 | 12/1988 | Coleman | 416/156 |
| 4,890,976 | 1/1990 | Jansson | 415/4.4 |
| 4,970,404 | 11/1990 | Barger | 416/119 |

FOREIGN PATENT DOCUMENTS 595541 2/1978 U.S.S.R. ............................. 416/61

Primary Examiner—Edward K. Look
Assistant Examiner—Michael S. Lee
Attorney, Agent, or Firm—Leon Gilden

[57] ABSTRACT

A wind turbine is arranged to provide for a front toroidal plate mounted from and spaced relative to a rear solid plate coaxially securing a deflecting cone coextensively and coaxially between the front and rear plate, with a series of equally spaced arcuate impeller blades mounted adjacent a periphery of the front and rear plates exteriorly of the cone to direct air flow through the turbine plates from the cone structure. The impeller also has a fluidic rotation indicator. The indicator is a set of arcuate liquid chambers which contain two different fluids of different colors and specific gravities. When the impeller is stationary, the two different fluids separate, indicating two colors. However, when the impeller rotates, the two fluids mix and indicate a single third color.

3 Claims, 5 Drawing Sheets

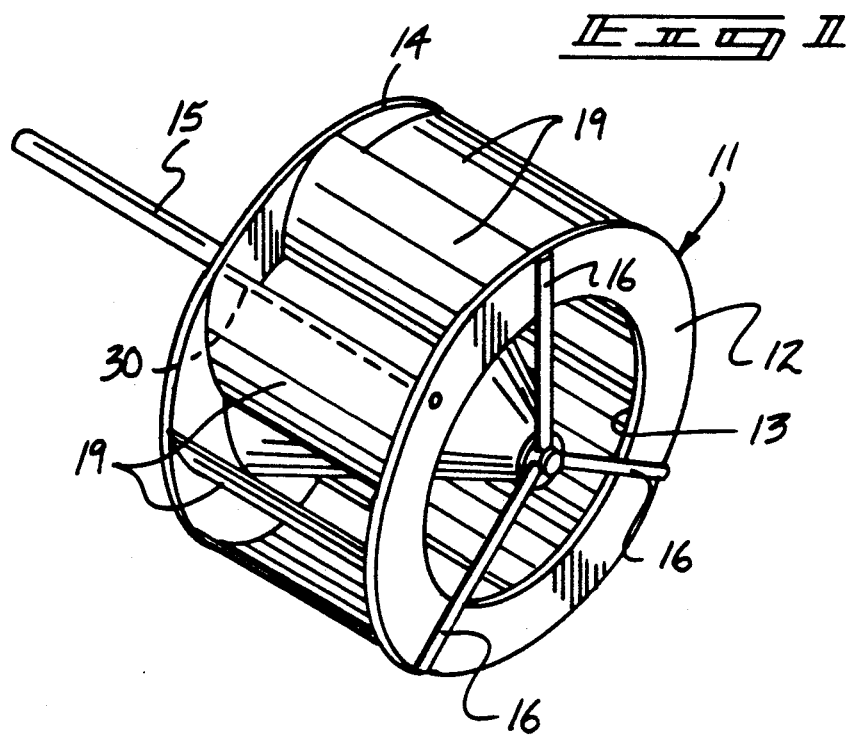
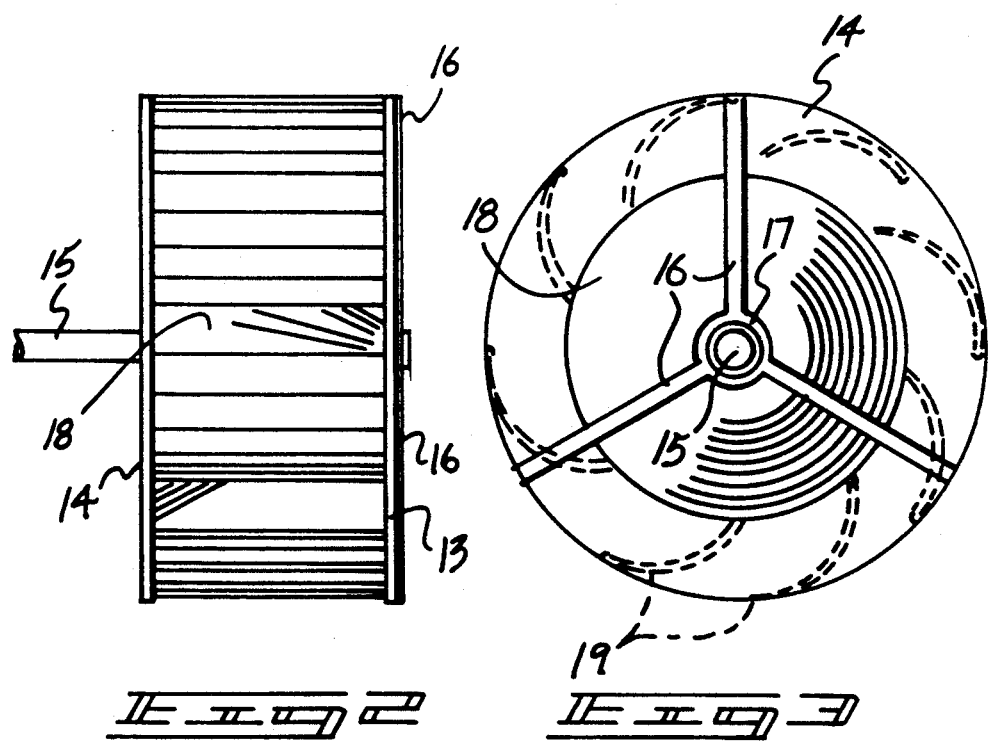

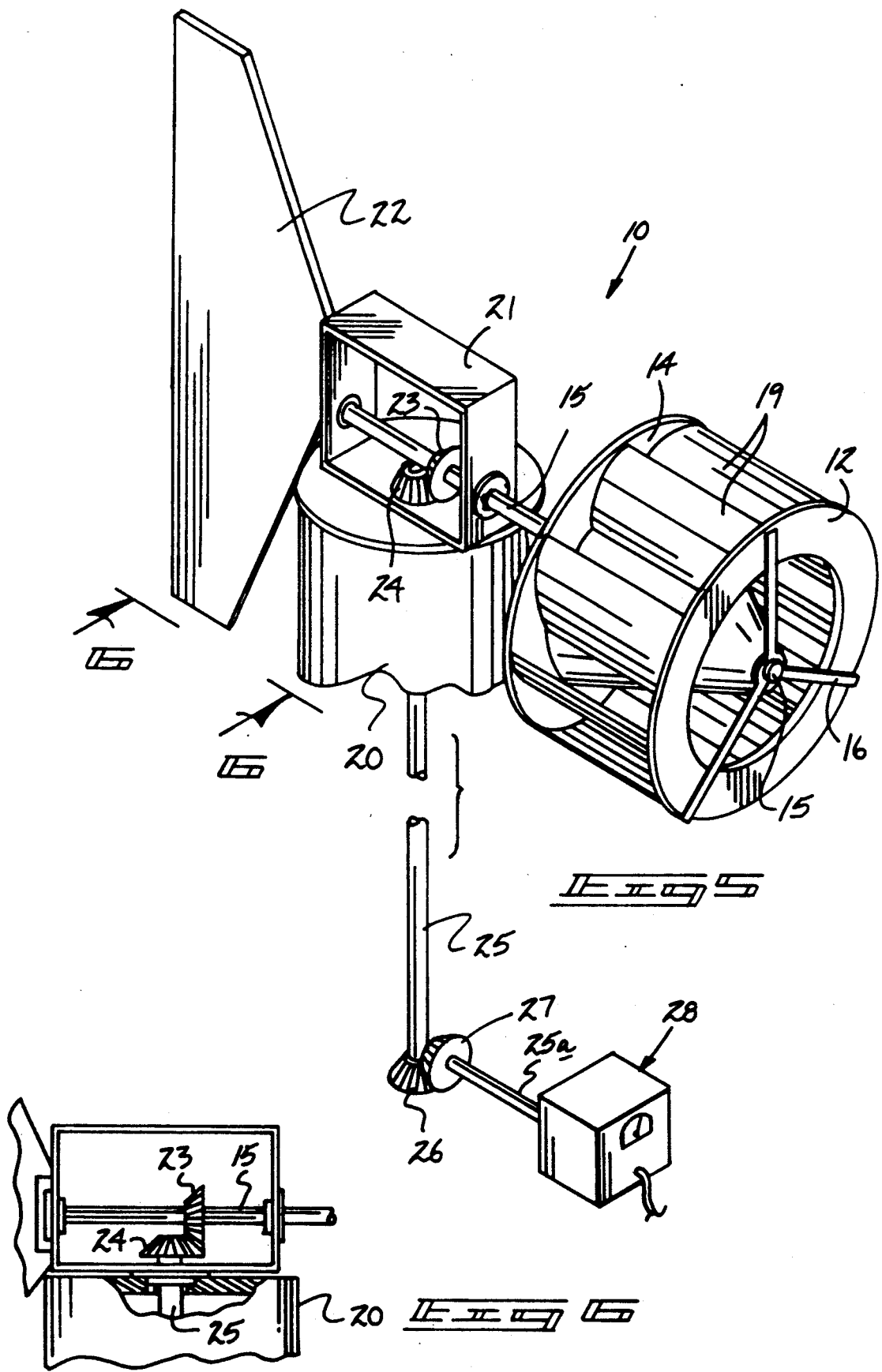

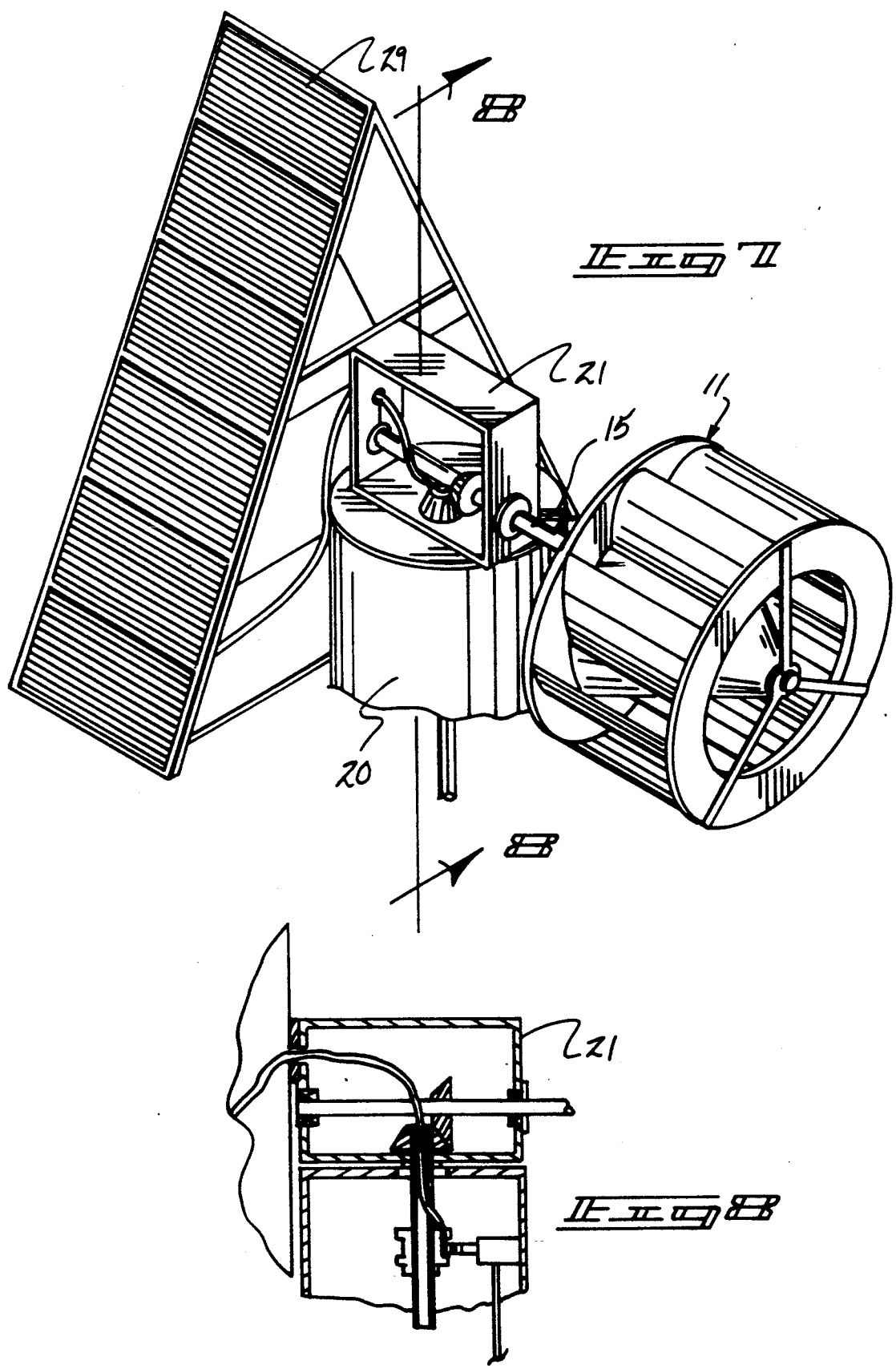

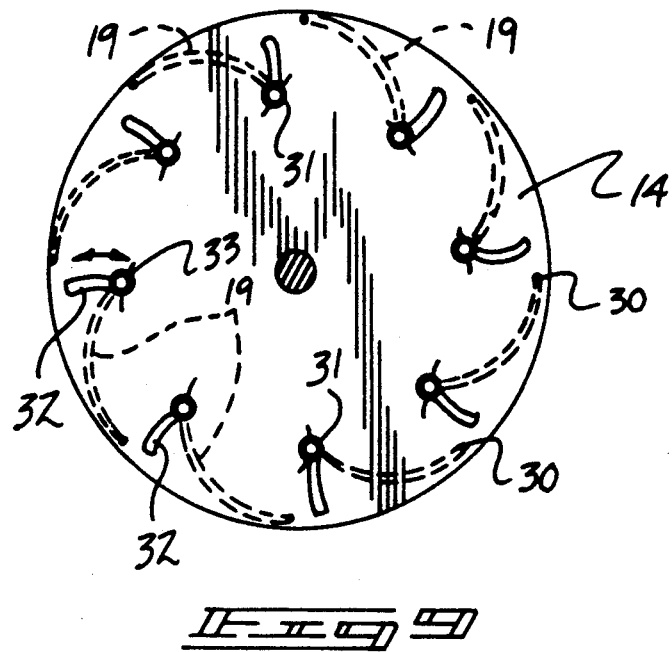
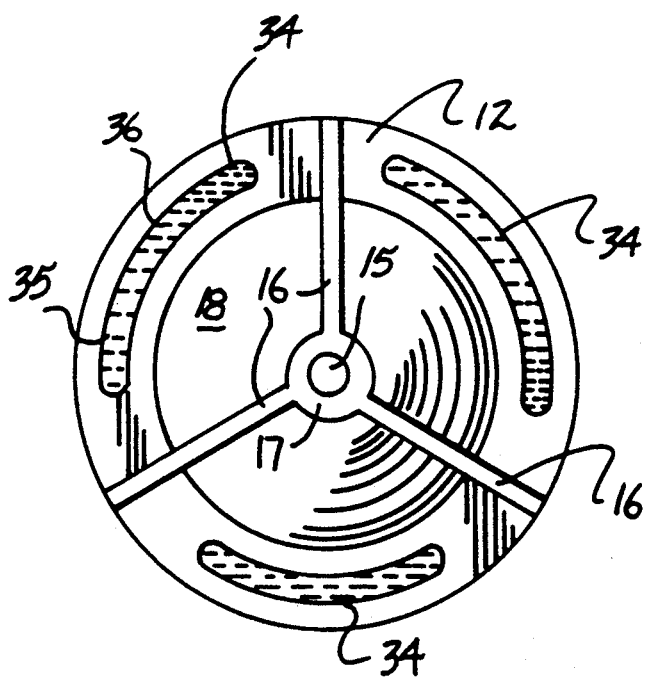

WIND TURBINE APPARATUS WITH FLUIDIC ROTATION INDICATOR

BACKGROUND OF THE INVENTION

1. Field of the Invention

The field of invention relates to wind turbine apparatus, and more particularly pertains to a new and improved wind turbine apparatus wherein the same is arranged to provide for a central deflecting cone to provide for an efficient and compact utilization of wind in conversion to electrical energy as required.

2. Description of the Prior Art

Wind turbine apparatus has been utilized throughout the prior art for the operation of various components, such as pumps, generators, and the like. Such apparatus is exemplified in U.S. Pat. No. 4,792,281 to Coleman wherein a wind turbine includes a hub permitting changing of pitch relative to a turbine blade structure permitting selective rotation of each turbine blade relative to a central support.

U.S. Pat. No. 4,890,976 to Jansson sets forth a wind turbine blade structure utilizing arcuate blades mounted within a housing as air is directed into the housing tangentially thereof to effect rotation of the blades.

As such, it may be appreciated that there continues to be a need for a new and improved wind turbine apparatus as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of wind turbine apparatus now present in the prior art, the present invention provides a wind turbine apparatus wherein the same is arranged to provide for a compact organization forming a unitary construction resistant to tilting and deflection relative to prevailing winds directed at the apparatus. As such, the general purpose of the present invention, which will be described subsequently in greater detail, is to provide a new and improved wind turbine apparatus which has all the advantages of the prior art wind turbine apparatus and none of the disadvantages.

To attain this, the present invention provides a wind turbine arranged to provide for a front torroidal plate mounted from and spaced relative to a rear solid plate coaxially securing a deflecting cone coextensively and coaxially between the front and rear plate, with a series of equally spaced arcuate impeller blades mounted adjacent a periphery of the front and rear plates exteriorly of the cone to direct air flow through the turbine plates from the cone structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved wind turbine apparatus which has all the advantages of the prior art wind turbine apparatus and none of the disadvantages.

It is another object of the present invention to provide a new and improved wind turbine apparatus which may be easily and efficiently manufactured and marketed.

It is a further object of the present invention to provide a new and improved wind turbine apparatus which is of a durable and reliable construction.

An even further object of the present invention is to provide a new and improved wind turbine apparatus which is susceptible of a low cost of manufacture with regard to both materials and labor, and which accordingly is then susceptible of low prices of sale to the consuming public, thereby making such wind turbine apparatus economically available to the buying public.

Still yet another object of the present invention is to provide a new and improved wind turbine apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the impeller housing utilized by the invention.

FIG. 2 is an orthographic side view of the impeller housing.

FIG. 3 is an orthographic frontal view of the impeller housing.

FIG. 5 is an isometric illustration of the organization mounted within a windmill structure.

FIG. 6 is an orthographic view, taken along the lines 6—6 of FIG. 5 in the direction indicated by the arrows.

FIG. 7 is an isometric illustration of a further modified aspect of the invention utilizing a solar back-up panel structure.

FIG. 8 is an orthographic view, taken along the lines 8—8 of FIG. 7 in the direction indicated by the arrows.

FIG. 9 is an orthographic rear view of a modified rear plate structure utilized by the invention.

FIG. 10 is an orthographic front view of the impeller housing utilizing a modified front plate structure.

DESCRIPTION OF THE PREFERRED EMBODIMENT

Figure 4:
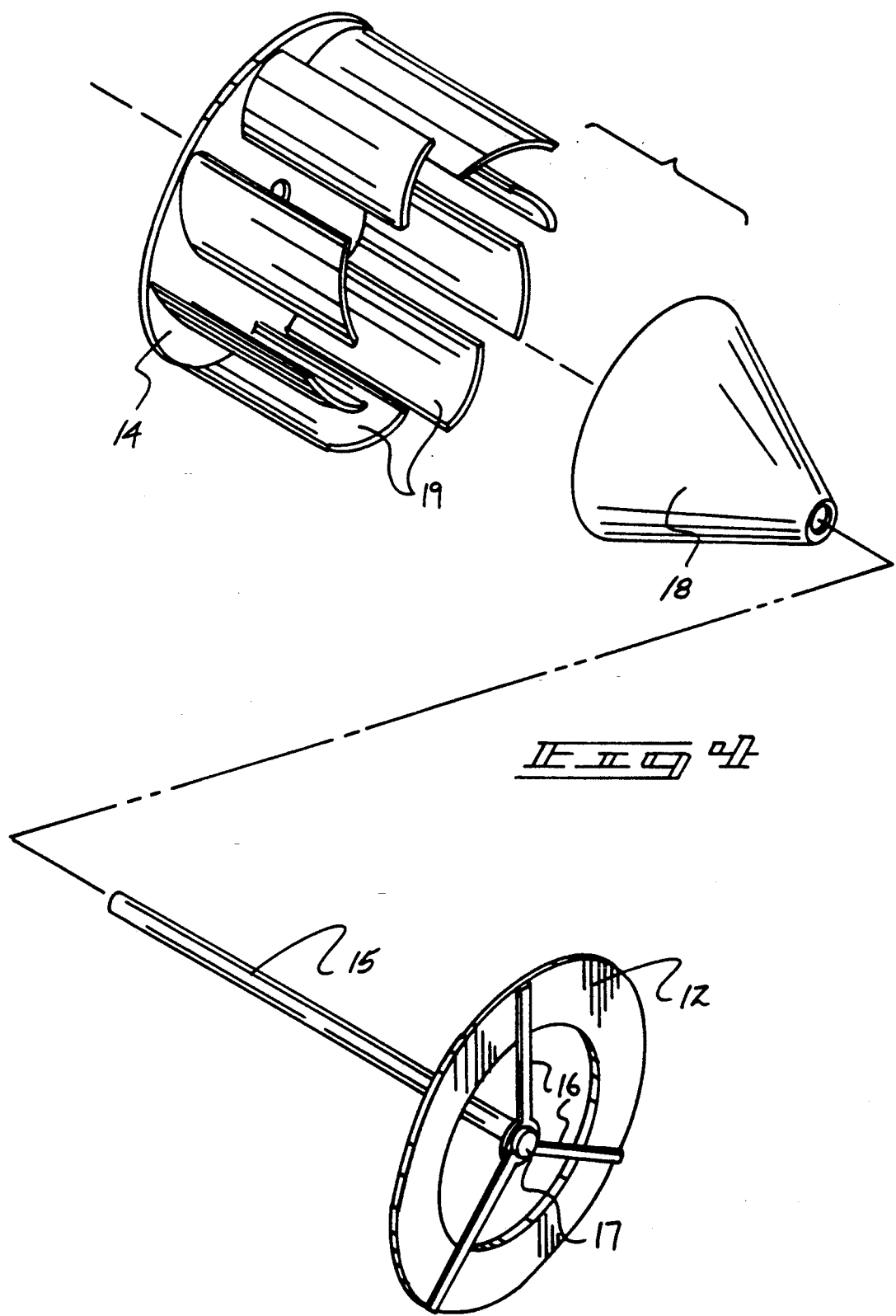
FIG. 4 is an isometric exploded illustration of the turbine structure utilized by the invention.

With reference now to the drawings, and in particular to FIGS. 1 to 10 thereof, a new and improved wind turbine apparatus embodying the principles and concepts of the present invention and generally designated by the reference numeral 10 will be described.

More specifically, the wind turbine apparatus 10 of the instant invention essentially comprises an impeller housing 11, such as illustrated in FIG. 1, including a front torroidal plate 12 defined by a predetermined diameter spaced from and parallel a rear plate 14 defined by a diameter substantially equal to the predetermined diameter coaxially aligned relative to the front plate 12. The front plate 12 further includes a central opening 13, with an axle shaft 15 coaxially and integrally mounted relative to the rear plate 14 extending at least to the front plate 12 and extending rearwardly and coaxially relative to the rear plate 14. A plurality of spaced radial brace legs 16 are radially adjacent the outer periphery of the front torroidal plate 12 radially thereof interiorly of the front plate 12 to define a central brace leg bearing ring fixedly receiving the forward terminal end of the axle shaft 15. A central cone 18 whose base is fixedly mounted on a forward surface of the rear plate 14 includes its apex positioned adjacent the central brace leg bearing ring 17 coaxially aligned with and mounted about the axle shaft 15. A plurality of spaced arcuate vanes 19, each defined about an equal radius of curvature whose axes are arranged parallel relative to one another and to the axle shaft 15 and mounted coextensively between the front plate 12 and the rear plate 15 exteriorly of the central cone 18. The vanes 19 are each canted to include an outer edge adjacent a periphery of the front and rear plates 12 and 14, with an inner edge positioned in a spaced relationship relative to the outer periphery of the front and rear plates, with the outer and inner edges of each vane arranged in a parallel relationship relative to themselves and the other vanes of the organization.

Reference to the FIG. 5 illustrates the use of a first support housing 20 positioned rearwardly of the impeller housing 11 and below the axle shaft 15 mounting a support cage 21 to a top surface of the first support housing 20 rotatably receiving the axle shaft 15 therethrough, with a first gear 23 mounted to the axle shaft within the cage 21 cooperating with the second gear 24 mounted to an upper terminal end of a first output shaft 25. A third gear 26 is mounted adjacent a lower distal end of the first output shaft 25 in communication with the fourth gear 27 mounted to a second output shaft 25a. An electric generator mounted to the second output shaft 25a is arranged for the production of electrical energy.

In a similar manner, auxiliary solar panels 29, such as illustrated in FIG. 7, may be utilized to cooperate in concert with the electrical generator in providing a continuous supply of electrical energy.

The FIGS. 9 and 10 illustrate the use of a modified rear plate 14 and front plate 12 respectively. The rear plate 14 illustrated in FIG. 9 is arranged to pivotally mount each of the vanes 19, wherein each of the vanes 19 includes a panel outer pivot axle 30 mounted to each vane 19, in a manner as illustrated in the FIG. 1 for example, orthogonally intersecting an outer periphery of the front and rear plates 12 and 14 permitting pivotment of each vane 19. Each of the outer pivot axles 30 are arranged parallel relative to one another. A panel inner axle 31 is directed through an inner edge of each vane 19 and is received within an arcuate slot 32 whose radius of curvature is coincident with the outer pivot axle 30 to permit pivotment of each vane about each outer pivot axle 30. A fastener 33 mounted to each inner axle 31 exteriorly of the rear plate 14 permits selective securement of each inner axle 31 relative to each slot to permit effective changing of pitch of each vane relative to the central cone 18.

The FIG. 10 illustrates the use of a plurality of arcuate liquid chambers 34 mounted to the forward surface of the front plate 12, wherein each liquid chamber 34 is spaced equally relative to an adjacent chamber, and includes a respective first and second fluid 35 and 36 of a respective first and second coloration and of a respective first and second specific gravity, wherein the first and second gravity is arranged to be greater than the second specific gravity to effect separation of the first and second liquid during periods of non-rotation of the housing 11. For example, the first fluid may be yellow and the second blue, whereupon rotation of the housing 11, the yellow and blue fluids will mix to provide for a resultant green coloration or third coloration. In this manner, the chambers 34 provide for rotation indicators of the housing to permit visual indication of rotation and energy generation produced by rotation of the housing 11.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A wind turbine apparatus, comprising, an impeller housing, the housing including a front torroidal plate spaced from a rear solid uninterrupted plate, wherein the front plate is parallel, coextensive with, and spaced from the rear plate in a coaxially aligned relationship, and an axle shaft fixedly mounted to the rear plate and to the front plate extending rearwardly of the rear plate, and a plurality of arcuate vanes mounted coextensively between the rear plate and front plate adjacent an outer periphery of the housing, wherein the outer periphery of the housing is defined by a rear plate outer periphery and a front plate outer periphery, and each arcuate vane includes an outer edge adjacent the outer periphery, and an inner edge spaced from the outer periphery, wherein the inner edge and outer edge are arranged in a parallel relationship, and a central cone, the central cone including a cone base, wherein the cone base is fixedly mounted to a forward surface of the rear plate, and a cone apex positioned to extend at least to the front plate, wherein the cone is arranged coaxially relative to the axle shaft, and the arcuate vanes are positioned between the central cone and the outer periphery, and a plurality of radial brace legs mounted to an outer surface of the front plate extending radially of the front plate terminating in a central bearing ring, with a forward terminal end of the axle shaft mounted within the bearing ring, and a plurality of arcuate liquid chambers mounted to the forward surface of the front plate, each liquid chamber spaced an equal radial distance relative to the axle shaft and equally spaced about the front plate, with each chamber including a first fluid and a second fluid contained therewithin, each first fluid defined by a first coloration and a first specific gravity, and each second fluid defined by a second coloration and second specific gravity, wherein the first coloration is distinct from that of the second coloration and the first specific gravity is unequal to the second specific gravity, whereupon rotation of the impeller hosing, the first fluid and second fluid are intermixed to define a third coloration.

2. An apparatus as set forth in claim 1 wherein the outer edge of each vane includes an outer pivot axle, and each outer pivot axle is arranged parallel relative to one another, and each outer pivot axle is mounted adjacent the outer periphery of the housing orthogonally directed through the front plate and the rear plate, and the inner edge of each vane includes an inner axle, and each inner axle including a slot, each slot directed to the rear plate, and the slot defined about a center of curvature whose radius extends from the outer pivot axle to the inner axle.

3. An apparatus as set forth in claim 2 including a fastener mounted to an outer terminal end of each inner axle rearwardly of each rear plate to effect selective securement of each inner axle relative to the rear plate to effect selective pivotment of each vane relative to the rear plate, wherein each outer pivot axle and each inner axle are arranged parallel relative to one another.

* * * * *